(12) United States Patent
Buntin et al.

(10) Patent No.: US 11,634,837 B2
(45) Date of Patent: Apr. 25, 2023

(54) SMALL-SCALE COTTON PROCESSING

(71) Applicant: Monsanto Technology LLC, St. Louis, MO (US)

(72) Inventors: Lindsey Buntin, Lubbock, TX (US); Dustin Cole, St. Charles, MO (US); Sheila Hobbs, Imperial, MO (US); Alex MacDonald, Wildwood, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 379 days.

(21) Appl. No.: 16/584,374

(22) Filed: Sep. 26, 2019

(65) Prior Publication Data

US 2020/0102669 A1    Apr. 2, 2020

Related U.S. Application Data

(60) Provisional application No. 62/737,617, filed on Sep. 27, 2018.

(51) Int. Cl.
| | |
|---|---|
| *A01C 1/08* | (2006.01) |
| *D01C 1/00* | (2006.01) |
| *D01G 9/00* | (2006.01) |
| *A23L 5/00* | (2016.01) |
| *D01C 1/02* | (2006.01) |

(52) U.S. Cl.
CPC .............. *D01C 1/00* (2013.01); *A23L 5/57* (2016.08); *D01C 1/02* (2013.01); *D01G 9/00* (2013.01); *A01C 1/08* (2013.01)

(58) Field of Classification Search
CPC ...................................................... A01C 1/08
See application file for complete search history.

(56) References Cited

U.S. PATENT DOCUMENTS 4,259,764 A    4/1981    Downing

FOREIGN PATENT DOCUMENTS

| CN | 87208840 U | 4/1988 |
|---|---|---|
| CN | 105659970 A | 6/2016 |
| CN | 108012616 A | 5/2018 |
| GB | 186943 A | 10/1922 |
| GR | 1003454 B | 11/2000 |

OTHER PUBLICATIONS

International Search Report and Written Opinion for PCT Application No. PCT/US19/53257, dated Feb. 12, 2020, 11 pages, Alexandria, Virginia, United States.

*Primary Examiner* — Monica L Perry
(74) *Attorney, Agent, or Firm* — Harness, Dickey & Pierce, P.L.C.

(57) ABSTRACT

A seed processing system for cottonseeds includes a fluid distribution system configured to sequentially dispense an acid solution, a base solution and a rinse liquid onto the cottonseeds. A seed applicator system defines an interior configured to hold the cottonseeds and receive the acid solution, base solution and rinse liquid dispensed from the fluid distribution system. The seed applicator system includes a rotor configured to agitate the cottonseeds in the interior as the acid solution, base solution and rinse liquid are dispensed onto the cottonseeds to effectuate mixing.

15 Claims, 7 Drawing Sheets

SMALL-SCALE COTTON PROCESSING

CROSS-REFERENCE TO RELATED APPLICATION

This application claims priority to U.S. Provisional Patent Application Ser. No. 62/737,617, filed Sep. 27, 2018, which is hereby incorporated by reference in its entirety.

FIELD OF THE DISCLOSURE

The present disclosure generally relates to a small-scale cotton processing system for use, for example, in a lab-type setting for testing a batch of cottonseeds.

BACKGROUND OF THE DISCLOSURE

The lint remaining on a cottonseed after the cotton product itself is separated from the cottonseed is often removed (e.g., delinting the cottonseed) in order to use the delinted (e.g., cleaned) cottonseed in a subsequent process.

Conventional methods for delinting fuzzy cottonseed in a lab-type setting requires a cottonseed technician using gloved hands and dipping the seeds in the concentrated acid. With the conventional method, the volume of acid can only serve to delint a limited number of samples. Over the course of a given number of samples, the linters turn the acid to a thicker viscosity, and efficiency of the acid to delint seeds declines. The spent acid effluent is manually transferred from the acid delinting container to the effluent system.

SUMMARY OF THE DISCLOSURE

In one aspect, a seed processing system for cottonseeds generally comprises a fluid distribution system configured to sequentially dispense an acid solution, a base solution and a rinse liquid onto the cottonseeds. A seed applicator system defines an interior configured to hold the cottonseeds and receive the acid solution, base solution and rinse liquid dispensed from the fluid distribution system. The seed applicator system includes a rotor configured to agitate the cottonseeds in the interior as the acid solution, base solution and rinse liquid are dispensed onto the cottonseeds to effectuate mixing.

In another aspect, a method of processing cottonseeds generally comprises loading cottonseeds into an interior of a seed applicator. Dispensing an acid solution into the interior of the seed applicator and onto the cottonseeds. Agitating the cottonseeds in the interior of the seed applicator to mix the acid solution and cottonseeds together. Permitting the acid solution to flow into a drain of the seed applicator to exit the interior of the seed applicator. After dispensing the acid solution, dispensing a base solution into the interior of the seed applicator and onto the cottonseeds. Agitating the cottonseeds in the interior of the seed applicator to mix the base solution and cottonseeds together. Permitting the base solution to flow into a drain of the seed applicator to exit the interior of the seed applicator.

BRIEF DESCRIPTION OF THE DRAWINGS

Corresponding reference characters indicate corresponding parts throughout the drawings.

DETAILED DESCRIPTION OF THE DISCLOSURE

Figure 1:
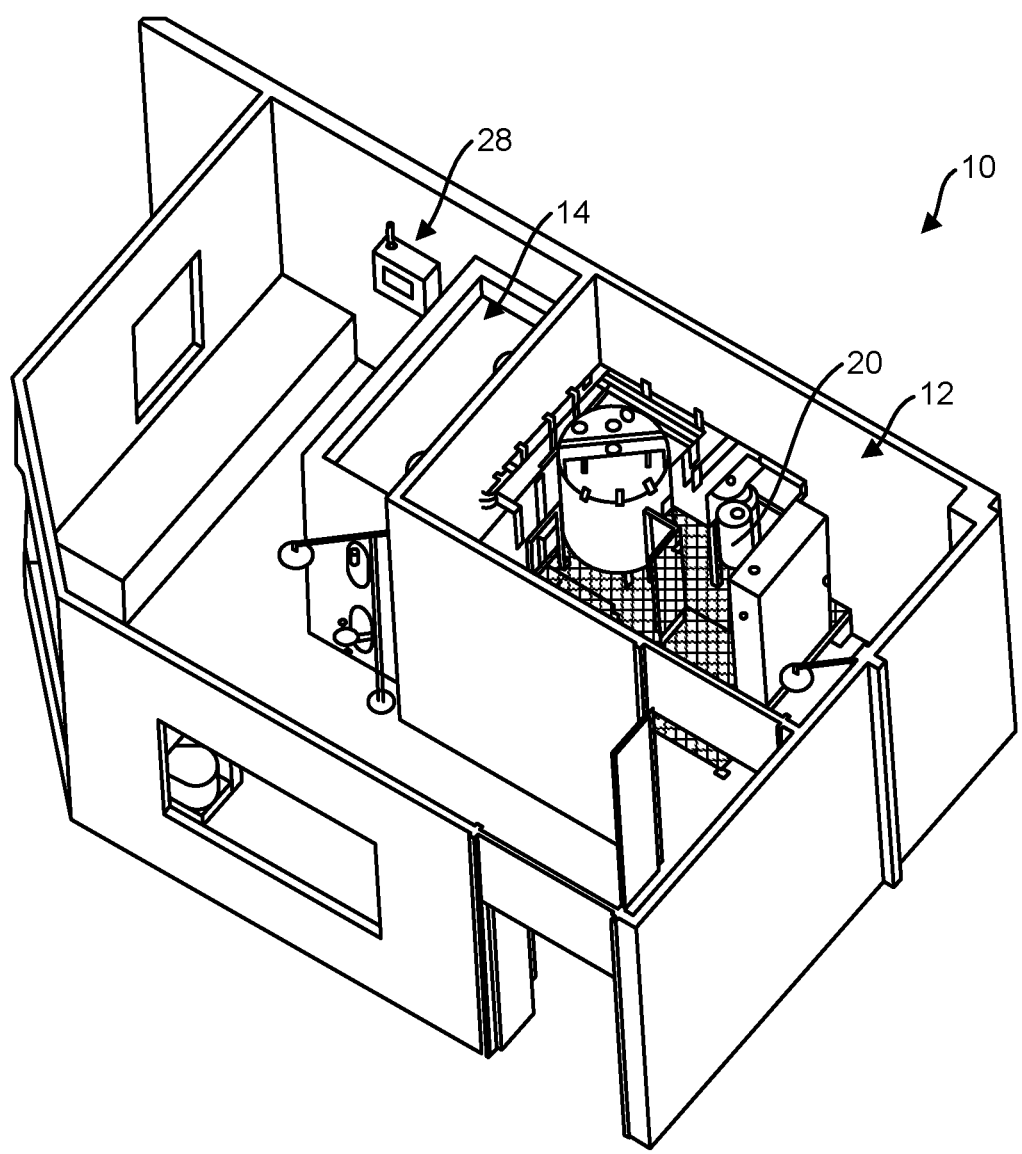
FIG. 1 is a perspective of the seed delinting system of the present disclosure.

Referring to FIG. 1, an automated seed processing system is generally indicated at 10. The illustrated seed processing system and method described herein is suitable for removing the lint from (e.g., delinting) a batch of cottonseeds using an acid, such as a concentrated acid (e.g., sulfuric acid). The illustrated seed processing system may also be suitable for eliminating, removing, killing, and/or deactivating microorganisms and/or biological agents (e.g., fungi, bacteria, viruses, spore forms, prions, unicellular eukaryotic organisms, etc.) on the seeds. Because the illustrated automated seed processing system 10 delints the fuzzy cottonseed, it may also be referred to herein as an automated seed delinting system.

The seed delinting system 10 includes a fluid distribution system, generally indicated at 12, and a seed applicator system, generally indicated at 14. As described in more detail below, the fluid distribution system 12 is fluidly connected to the seed applicator system 14 and delivers various fluids to the seed applicator system during the delinting process. The seed applicator system 14 mixes the various fluids from the fluid distribution system 12 with the cottonseeds to delint the seeds. The seed delinting system 10 automates the seed delinting process on a small (e.g., test) scale while optimizing throughput, improving human safety, promoting consistency and reducing the amount of fluids used, as described below and will become readily apparent.

Figure 2:
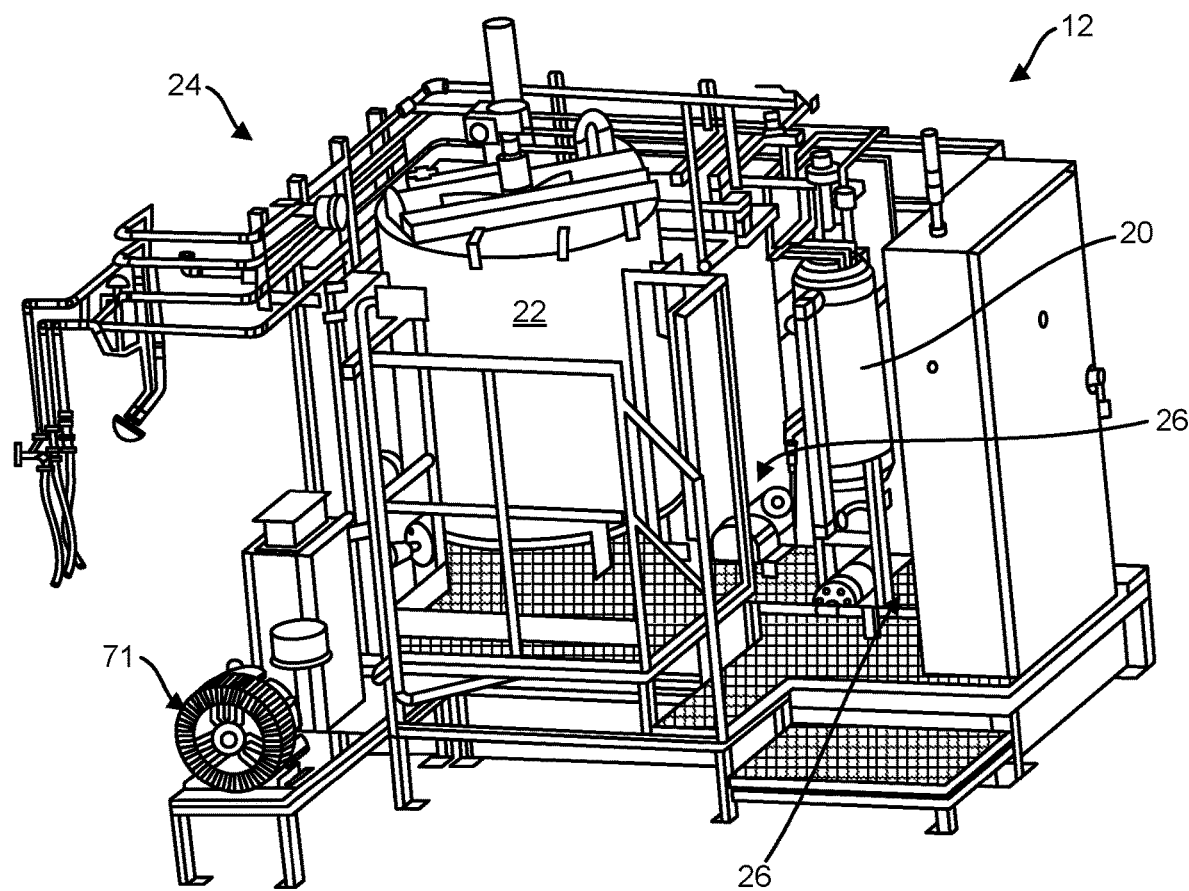
FIG. 2 is a perspective of a fluid distribution system of the seed delinting system.
Figure 7:
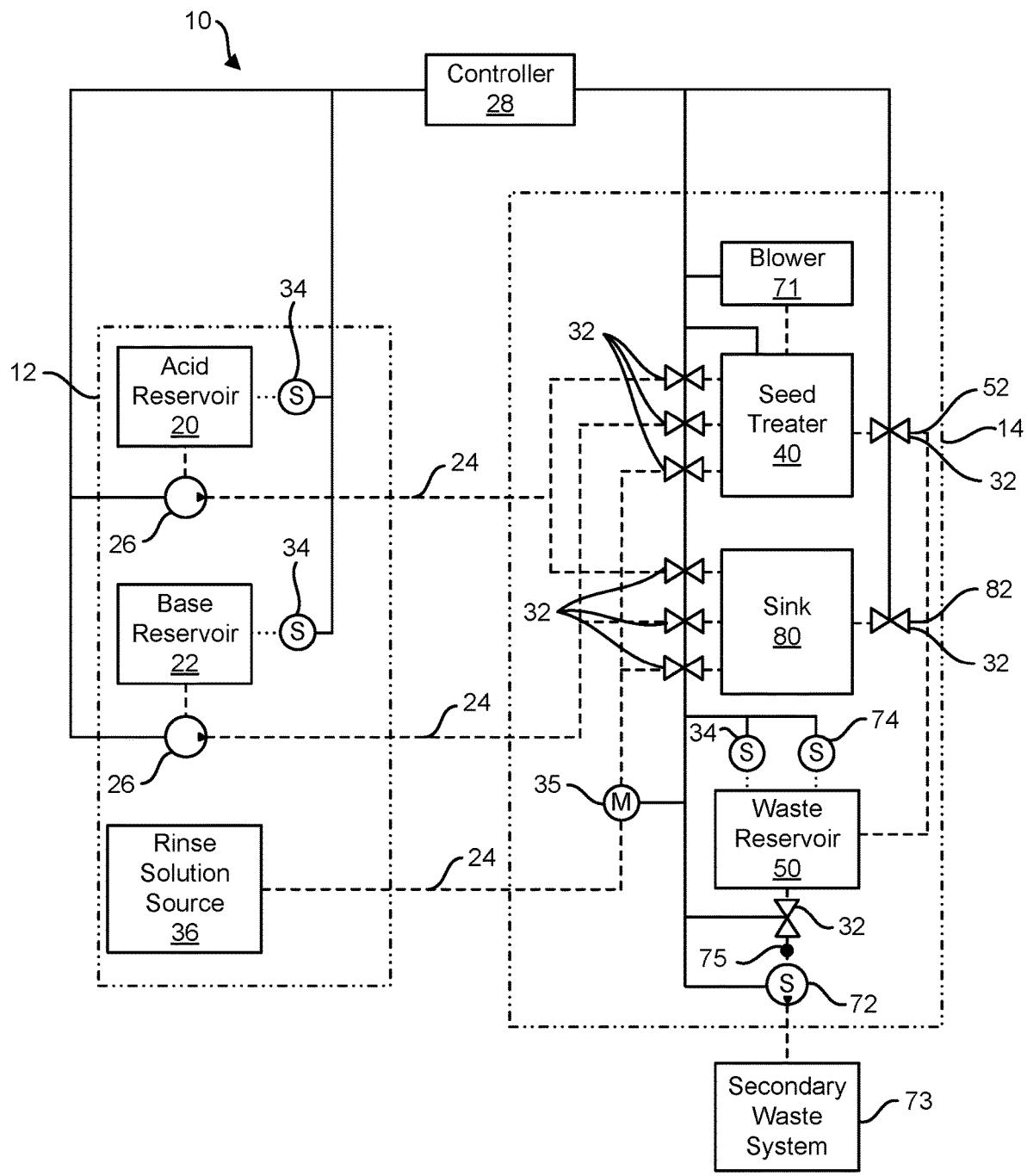
FIG. 7 is a schematic diagram of the seed delinting system.

Referring to FIGS. 1, 2 and 7, the fluid distribution system 12 is configured to deliver a concentrated acid solution, a base solution, and a rinse liquid to the seed applicator system 14. The fluid distribution system 12 includes an acid reservoir 20 configured to store the concentrated acid solution and a base reservoir 22 configured to store the base solution. The acid and base reservoirs 20, 22 are fluidly connected to the seed applicator system 14 with a plurality of supply lines and manifolds, generally indicated at 24. The acid and base reservoirs 20, 22 each have a dedicated supply line 24 fluidly connecting each respective reservoir to the seed applicator system 14 to prevent any cross-contamination of the solutions. A first pump 26 is fluidly connected to the dedicated supply line 24 for the base reservoir 22 to move the solution from the base reservoir to the seed applicator system 14. A second pump 26 (FIG. 7), separate from the first pump 26, is fluidly connected to the dedicated supply line 24 for the acid reservoir 20 to move the solution from the acid reservoir to the seed applicator system 14. In one embodiment, each pump 26 is a metering pump, such as a peristaltic metering pump, capable of delivering a set amount of fluid to the seed applicator system 14. In one embodiment, each supply line 24 also includes a selectively actuatable valve 32 (FIG. 7) fluidly connect to the supply line upstream of the seed applicator system 14. For example, in one embodiment, the selectively actuatable valves 32 are disposed between the pumps 26 and the seed applicator system 14. The selectively actuatable valves 32 are configured to open and close for a designated amount of time to allow for the flow of the fluids through the supply line 24 from the fluid distribution system 12 to the seed applicator system 14. Any type of selectively actuatable valve 32 can be used. For example, the selectively actuatable valves 32 may be pneumatic or electronic so that the valves can be automatically opened and closed.

In one embodiment, the acid reservoir 20 includes a glass window that provides a view of the interior of the reservoir so that a technician can visually see the amount of the concentrated acid solution in the reservoir. The acid and/or base reservoirs 20, 22 may also include one or more fluid level sensors 34 (FIG. 7) such as a continuous level sensor to continuously determine the amount of solution in the reservoir. The fluid level sensors 34 may also comprise a high limit level sensor and/or a low limit level sensor to determine when the solution in the reservoir has reached a fill position and/or an empty position. In one embodiment, a pump is used to fill the acid reservoir 20 with the concentrated acid solution from a manufacturer's container (e.g., a barrel). The pump used to fill the acid reservoir 20 may be the same pump 26 that moves the concentrated acid solution to the seed applicator system 14 or a different pump. In this embodiment, a momentary pushbutton switch (not shown) is used to selectively operate the pump to fill the acid reservoir 20. In one embodiment, the technician prepares the base solution and then manually fills base reservoir 22. In one embodiment, the acid and/or base reservoirs 20, 22 may include an agitator (not shown) that agitates (e.g., stirs) the solution in the reservoir. The acid and/or base reservoirs 20, 22 may also contain a heater (not shown) to heat the solution. For example, in one embodiment, the continuous level sensor for the base reservoir 22 is in communication with the agitator in the reservoir such that the agitator agitates the base solution when the base reservoir is filled to or above a predetermined level with base solution.

The fluid distribution system 12 also includes another supply line 24 fluidly connecting the seed applicator system 14 to a rinse liquid source 36 (FIG. 7). Preferably, the rinse liquid source 36 is a water utility main, although the rinse liquid source can be a reservoir, as described above, for water or other rinse liquid, including a liquid solution or mixture. The supply line 24 for the rinse liquid is also a dedicated supply line for supplying the seed applicator system 14 with the rinse liquid. A selectively actuatable valve 32, as described above, is fluidly connected to the supply line 24 that supplies the rinse liquid upstream of the seed applicator system 14 to control the flow of the rinse liquid to the seed applicator system. A flow meter 35 (FIG. 7) is also fluidly connected to the supply line 24 that supplies the rinse liquid to measure the amount of rinse liquid delivered to the seed applicator system 14. In one embodiment, the flow meter 35 is a magnetic flow meter, although any suitable flow meter can be used. In one embodiment, it is understood that the various components of the fluid distribution system 12, such as but not limited to the acid and base reservoirs 20, 22, supply lines 24, pumps 26, valves 32, and flow meter 35, are all appropriately rated and constructed to operate and function with the concentrated acid solution, base solution, and/or rinse liquid. Preferably, the various components of the fluid distribution system 12 are rated to operate and function with all of the solutions (acid, base and rinse). Ensuring the various components of the fluid distribution system 12 are rated to operate with all the solutions reduces the risk of installing a component that cannot operate (e.g., will fail) with a particular solution. It is understood the fluid distribution system 12 may have other arrangements and configurations without departing from the scope of the present disclosure.

In one embodiment, the seed delinting system 10 includes a controller 28 (FIG. 7) configured (e.g., programmed) to operate the seed delinting system. In one embodiment, the controller 28 is in communication with and is configured to operate the various components of the seed delinting system 10. For example, the controller 28 can be in communication with and configured to operate the various components of the fluid distribution system 12 such as but not limited to the pumps 26, selectively actuatable valves 32, and/or the various sensors. The controller 28 can be configured (e.g., programmed) to control the pumps 26 to deliver the concentrated acid solution and/or base solution from the acid and/or base reservoirs 20, 22 to the seed applicator system 14. The controller 28 can be configured such that the pumps 26 deliver a predetermined amount of the solutions from the reservoirs 20, 22. In this embodiment, the controller 28 is also configured (e.g., programmed) to operate (e.g., open and close) the corresponding selectively actuatable valves 32 on the supply lines 24 in conjunction with the pumps 26 being turned on and off to deliver the solution. Similarly, the controller 28 can operate the selectively actuatable valve 32 connected to the rinse liquid supply line 24 based on signals received from the flow meter 35 (indicating the amount of rinse liquid delivered) to control the total amount of rinse liquid delivered to the seed applicator system 14. Moreover, the controller 28 can be in communication with the low level limit sensors 34 in the reservoirs 20, 22 such that when the amount of the concentrated acid solution and/or base solution gets low, an alert is sent to the technician to fill the reservoir. In addition, the controller 28 may prevent the seed delinting system 10 from operating, such as by preventing the pumps 26 from delivering solution, until the solution that is low is replenished. In this example, the continuous level sensor and/or high limit level sensor 34 would communicate with (e.g., send signals to) the controller 28 indicating when the reservoir 20, 22 is full and/or at an acceptable level to operate the seed delinting system 10. Further, the controller 28 may also be in communication with the pump used to fill the acid reservoir 20 such that when the high limit level sensor 34 sends a signal to the controller indicating the maximum fill position has been reached, the controller can send a signal to turn off the pump. It is understood that other configurations, methods and devices for controlling the fluid distribution system 12 are within the scope of the present disclosure.

Figure 3:
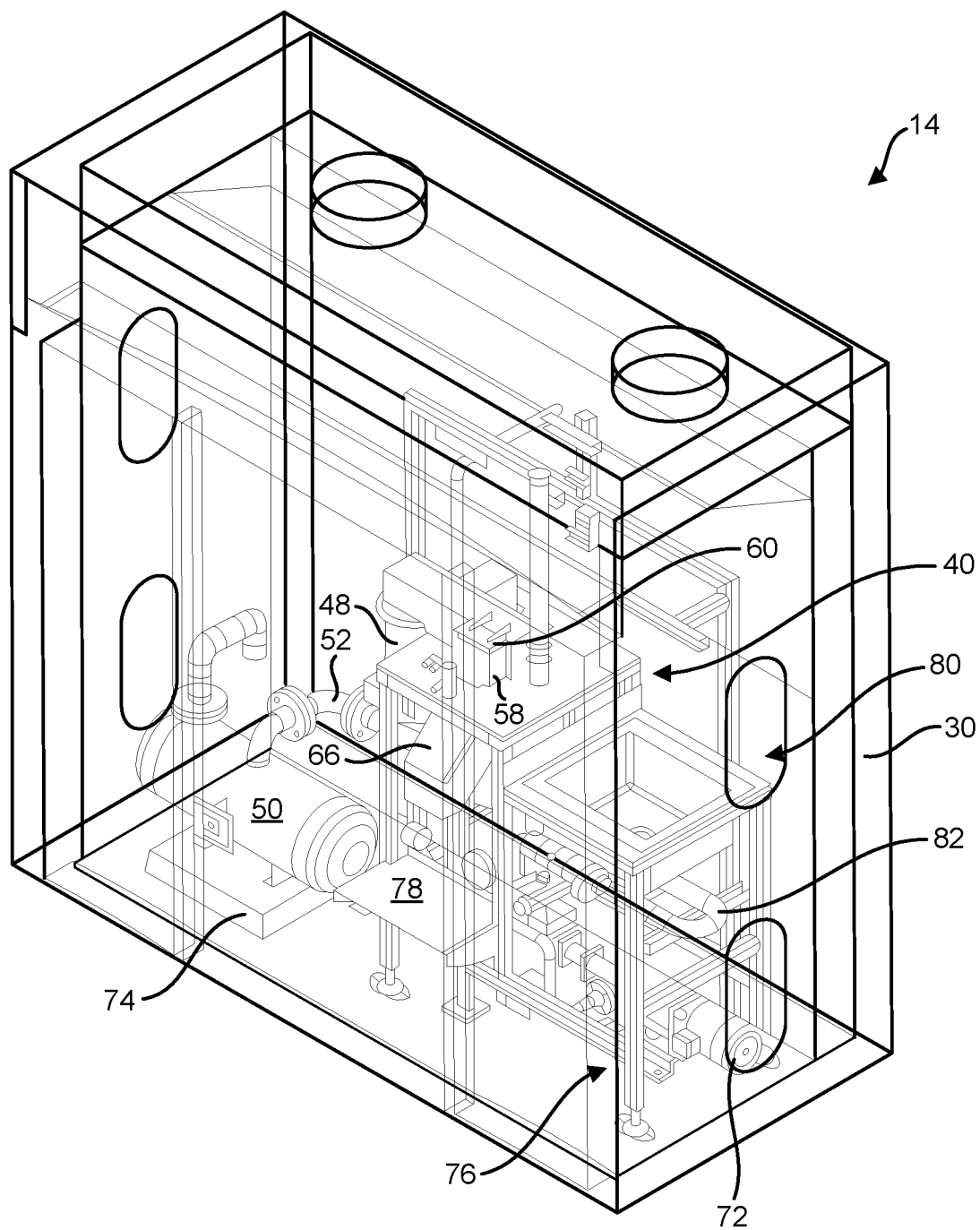
FIG. 3 is a perspective of a fluid applicator seed delinting system with a fume hood shown transparent.
Figure 4:
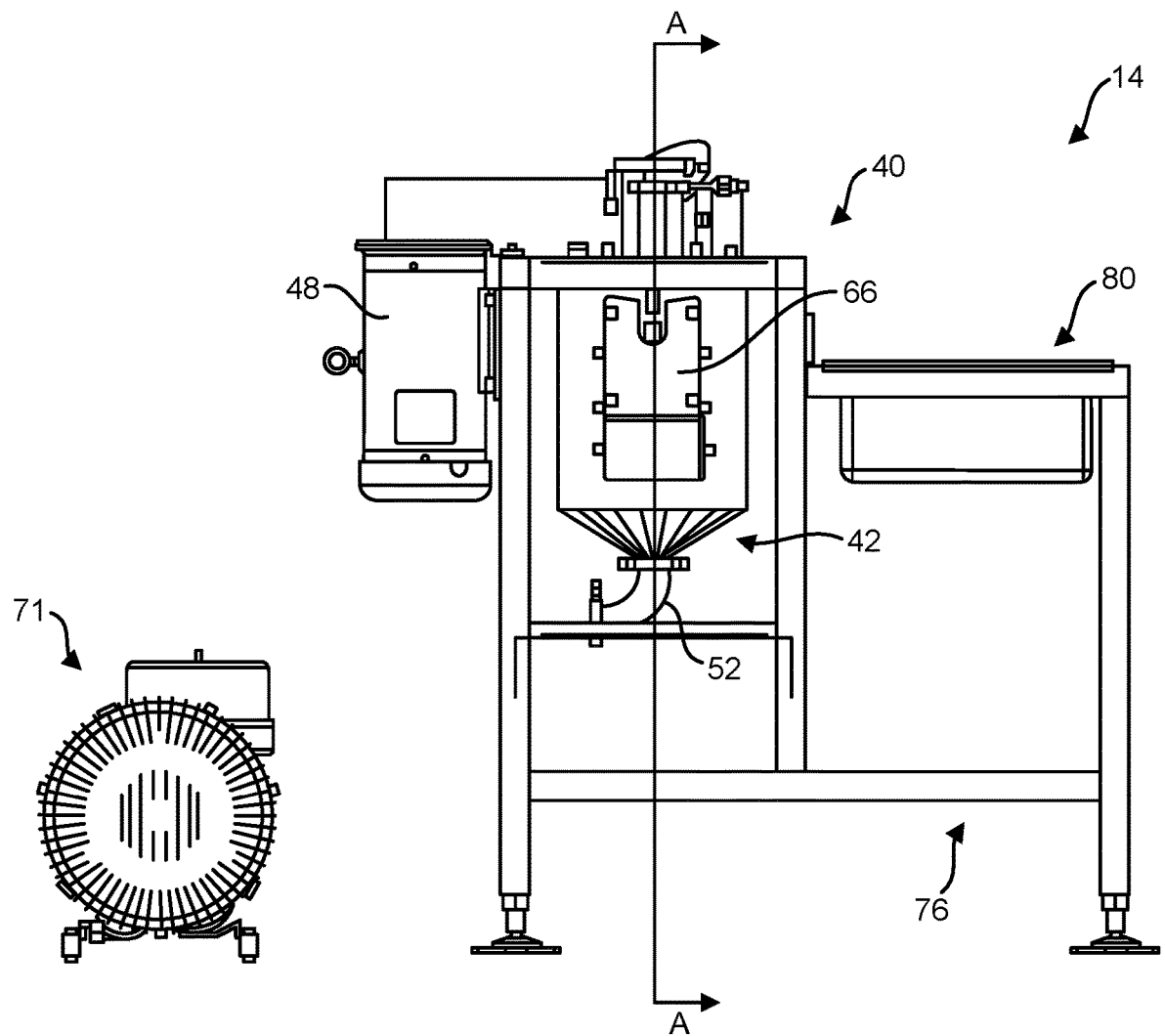
FIG. 4 is a front view of the fluid applicator system.

Referring to FIGS. 3-5 and 7, the seed applicator system 14 is configured to apply the various solutions from the fluid distribution system 12 to delint the cottonseeds. As shown in FIG. 3, the entire seed applicator system 14 is sized and shaped to be disposed in a fume hood 30 so that any fumes produced during the delinting process are contained and properly handled. The seed applicator system 14 includes a seed applicator 40 with a mixing bowl 42 that defines an interior (e.g., mixing chamber) 44 configured to receive the seeds and solutions therein. The seed applicator 40 includes a rotor 46 (or other suitable mixer or suitable agitator) disposed in the interior 44 between the upper and lower ends of the mixing bowl 42. The rotor 46 is generally bowl shaped and is configured to rotate about a vertical axis relative to the mixing bowl 42 to effectuate mixing of the seeds and solutions. The rotor 46 is operatively connected to a driver 48, such as a motor. In the illustrated embodiment, the rotor 46 is secured to a drive shaft 47 that is operatively connected to and rotated by the driver 48. The driver 48 drives rotation of the rotor 46 in the interior 44 to agitate the cottonseeds to effectuate mixing of the seeds and solutions/liquid(s) together, as described in more detail below. The rotor 46 divides the interior 44 into an upper portion which receives the seeds and solutions and a lower portion. The rotor 46 is configured to keep the seeds in the upper portion of the interior 44 but also permit the solutions to flow into the lower portion of the interior 44 from the upper portion through a clearance between the rotor and the interior. A drain 52 is connected to the lower end of the mixing bowl 42. The drain 52 is fluidly connected to the interior 44 and permits the solutions to exit the interior 44 of mixing bowl 42. The drain 52 connects to a waste reservoir 50 which collects the spent solutions in the delinting process. In one embodiment, the drain 52 includes a selectively actuatable valve 32 (FIG. 7) fluidly connected to the drain and configured to open and close the drain to permit fluid to flow there-through. The seed applicator 40 may also include an atomizer 54 connected to the drive shaft 47 above the rotor 46. The atomizer 54 is configured to evenly distribute the solutions from the fluid distribution system 12 over the seed.

Figure 5:
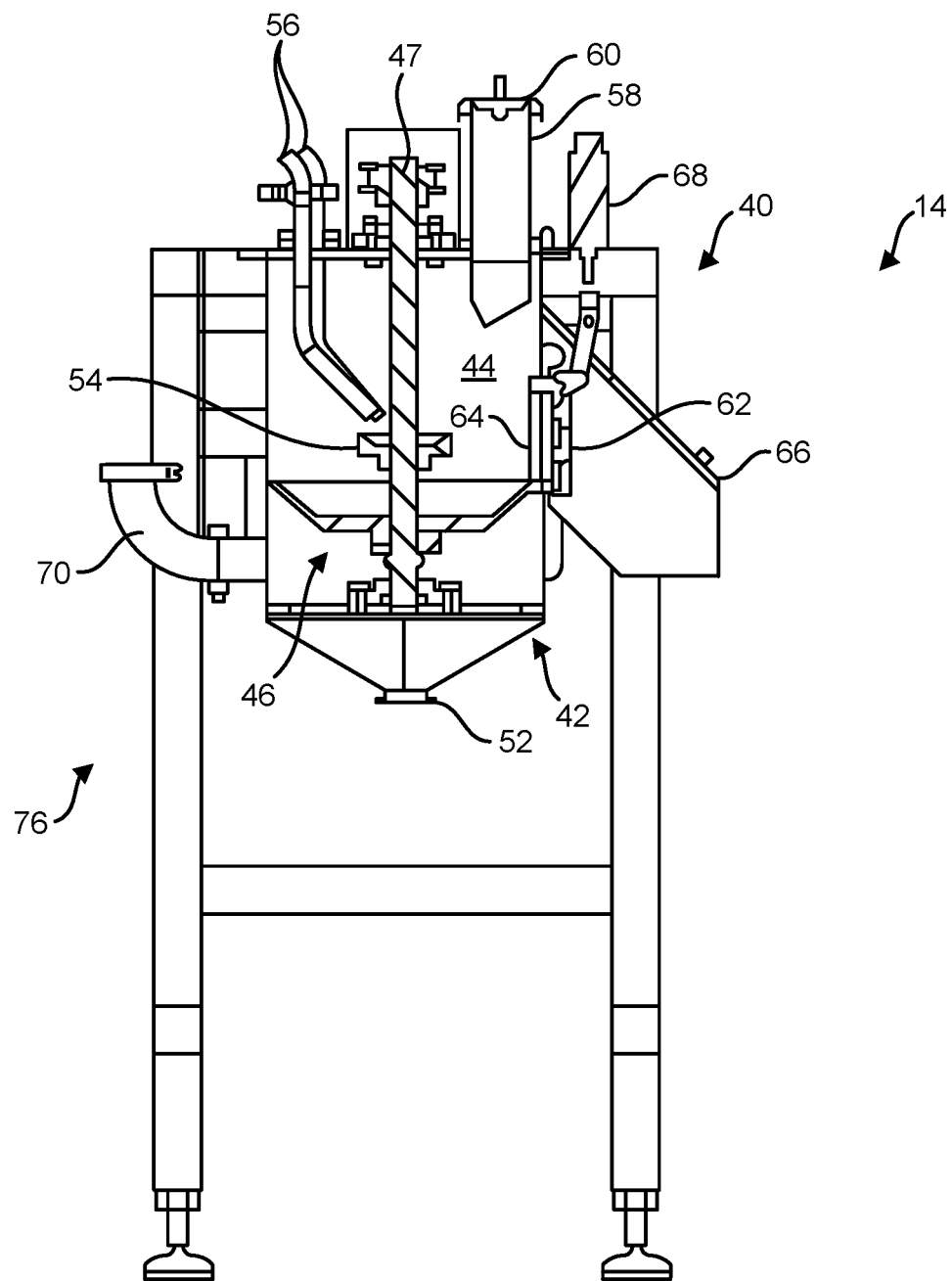
FIG. 5 is a cross section taken through line A-A in FIG. 4.

The seed applicator 40 includes three nozzles 56 (only two of which are shown in FIG. 5) disposed in the interior 44 of the mixing bowl 42. Each nozzle 56 is configured to dispense one of the solutions onto the seeds in the interior 44. Specifically, each nozzle 56 directs the solution toward the atomizer 54 which then evenly distributes the solution over the seeds. Each nozzle 56 is fluidly connected to one of the supply lines 24 such that one nozzle dispenses the concentrated acid solution, one nozzle dispenses the base solution, and one nozzle dispenses the rinse liquid when the fluid distribution system 12 delivers the solutions to the seed applicator system 14. The nozzles 56 can dispense the solutions while the rotor 42 is stationary or rotating. In other words, the solutions can be dispensed into the interior 44 while the seeds are stationary or flowing within the interior. In some embodiments, the rotor 42 must be in 'run' mode before the nozzles 56 will open. The seed applicator 40 also includes a seed loading chute 58 that is used by the technician to fill the interior 44 of the mixing bowl 42 with cottonseeds (e.g., cottonseeds with lint). A lid 60 closes the seed loading chute 58 and is secured in place with a latch (not shown). The technician opens the lid 60 and then places the seeds into the seed loading chute 58, where the seeds are directed (e.g., fall) into the mixing bowl 42. In various embodiments, there may be a proximity switch (not shown) on lid 60 that will prevent the cycle from starting if the chute 58 is open.

The seed applicator 40 includes a discharge door 62 that opens and closes a discharge opening 64 defined by the mixing bowl 42. A seed chute 66 is positioned over the discharge opening 64 and discharge door 62 such that when the discharge door is opened, the seeds may flow out of the interior 44 of the mixing bowl 42 and into the seed chute based on gravitational force. In one embodiment, the discharge door 62 is operatively connected to an actuator 68 that moves the door between the open and closed positions. In one embodiment, the actuator 68 is a pneumatic actuator. The actuator 68 may have a position sensor (not shown) to confirm the discharge door 62 is in either the open or closed positions. The discharge door 62 includes a seal (not shown), such as an O-ring, so that the door forms a leak proof seal with the mixing bowl 42 to prevent any solutions or seeds from leaking out from the discharge opening 64. Preferably, the actuator 68 applies a sufficient amount of pressure to the discharge door 62 to form and maintain the fluid tight or leak proof seal between the door and mixing bowl 42. The O-ring may be acid-resistant.

The seed applicator system 14 also includes a blower 71 (FIGS. 2, 4, and 7) fluidly connected to the interior 44 of the mixing bowl 42 of the seed applicator 40 by a duct 70 (FIG. 5). The blower 71 is configured to direct heated air into the interior 44 to dry the cottonseeds therein after the solutions have been applied. For example, in one embodiment, the blower 71 can direct approximately 200 SCFM (Standard Cubic Feet per minute) of air into the interior 44 to dry the seeds. The blower 71 can also direct ambient air into the interior 44 to help facilitate the discharge of the seeds through the discharge opening 64. Preferably, the blower 71 is heated and supplies heated forced air to the interior 44 to dry the seeds faster. For example, in one embodiment, the blower 71 supplies heated air having a temperature between, such as, for example, about 120° F. to about 155° F. (about 49° C. to about 68° C.). The 155° F. (68° C.) upper limit of the temperature of the forced air safeguards against exposing the seeds to high temperatures to prevent the seed from reaching a temperature (e.g., 150° F. (66° C.)), which damages the seeds making them no longer viable for germination, but minimizes the amount of drying time required for the seeds. In one embodiment, a temperature sensor (not shown) is connected to the duct 70 to detect the temperature of the forced air supplied by the blower 71. In the illustrated embodiment, the duct 70 that carries the forced air from the blower 71 directs the forced air into the lower portion of the interior 44. In this embodiment, the forced air then flows into the upper portion of the interior 44 (by flowing through or around the rotor 46) to dry the seeds. The seed applicator 40 includes an exhaust port (not shown) configured to allow the forced air supplied by the blower 71 to escape the interior 44. In this embodiment, the exhaust port vents the forced air into the fume hood 30 to be collected. In some embodiments, the fume hood 30 may have a discharge fan (not shown). Due to safety precautions, in some situations, the process will not proceed unless the fume hood 30 is on.

The waste reservoir 50 collects the solutions from the drain 52 as they flow out of the seed applicator 40. In one embodiment, a pump 72 is fluidly connected to the waste reservoir 50 to move the collected waste solutions (e.g., spent solutions) to a secondary waste system 73 on or off-site. The pump 72 can be any suitable pump such as a progressive cavity pump. In one embodiment, a selectively actuatable valve 32 is disposed between the waste reservoir 50 and the pump 72 and is configured to open and close to control the flow of the fluid to the pump, for example, based on the amount of solution in the waste reservoir 50. The waste reservoir 50 may also include a pressure release valve (not shown) configured to release excess pressure from the waste reservoir. The waste reservoir 50 may also include one or more fluid level sensors 34 such as one or more of a continuous level sensor, high level limit sensor(s) and/or low level limit sensor(s) that are configured to determine the amount/position of the waste solution in the waste reservoir. In the illustrated embodiment, the waste reservoir 50 is supported by a scale 74 configured to measure the weight of the waste reservoir 50 as the solutions fill the reservoir and the pump 72 empties the reservoir. In one embodiment, there may be an alarm in the secondary waste system 73 that will not allow the delinting system 10 to begin if the level is too high, due to safety precautions. In one embodiment, a basket strainer 75 is disposed between the valve 32 and the pump 72 to strain out particulate from the spent solutions prior to the solutions being delivered to the secondary waste system 73.

The seed applicator system 14 includes a frame 76 that supports the various components of the seed applicator system 14 such as but not limited to the seed applicator 40. A platform 78 is connected to the frame 76 beneath the seed chute 66. The platform 78 is configured to support and hold a receptacle (not shown) below the seed chute 66 to collect/receive the delinted seeds from the seed applicator 40. A sink 80 is also connected to the frame 78 and includes a sink drain 82 (FIG. 3) fluidly connected to the waste reservoir 50 to permit fluid to exit the sink. In one embodiment, the sink drain 82 includes a selectively actuatable valve 32 configured to open and close to allow for the flow of fluids through the sink drain 82. The sink 80 includes three inlets (not shown), each inlet fluidly connected to one of the acid reservoir 20, base reservoir 22, and rinse liquids source by the supply lines 24. The inlets can be any suitable device configured to dispense a liquid such as but not limited to a nozzle, faucet, etc. A selectively actuatable valve 32 (FIG. 7) may be associated with each inlet and configured to open and close. The flow is controlled by the pumps through the supply line 24. The selectively actuatable valves 32 for each inlet may be pneumatic or electronic, as described above, or they can be a manually operated valve. In one embodiment, the sink 80 includes two manually operable switches (not shown), such as push buttons, operatively connected to each of the pumps 26 such that when the push button is actuated, the associated pump delivers the corresponding solution to the sink (after the associated valve is opened) via the supply lines 24. It is understood that opening the selectively actuatable valve 32 corresponding to the rinse liquid will deliver the rinse liquid to the sink 80 due to the pressure supplied by the water main. In this manner, by operating the selectively actuatable valves 32 and/or push button, the technician can selectively control the flow of the concentrated acid solution, base solution and rinse liquid to manually delint the cottonseeds, as discussed in more detail below. It is understood the seed applicator system 14 may have other arrangements and configurations without departing from the scope of the present disclosure.

The controller 28 may also be in communication with and configured to operate the various components of the seed applicator system 14 such as, but not limited to, the driver 48, the selectively actuatable valves 32, the various sensors, the pumps 26, 72 and/or the scale 74. For example, the controller 28 can be configured (e.g., programmed) to operate the driver 48 to control the rotation (e.g., speed, duration, etc.) of the rotor 46 in the seed applicator 40. Further, the controller 28 can be in communication with the sensors and/or scale of the waste reservoir 50 and operate the pump 72 to empty the waste reservoir when it is full and/or prevent the seed delinting system 10 from operating when the waste reservoir is full. The controller 28 can also operate the blower 71 to deliver the forced air to the seed applicator 40. Accordingly, the controller 28 provides automated operation of the seed delinting system 10. It is understood that other configurations, methods and devices for controlling the seed applicator system 14 are within the scope of the present disclosure.

Figure 6:
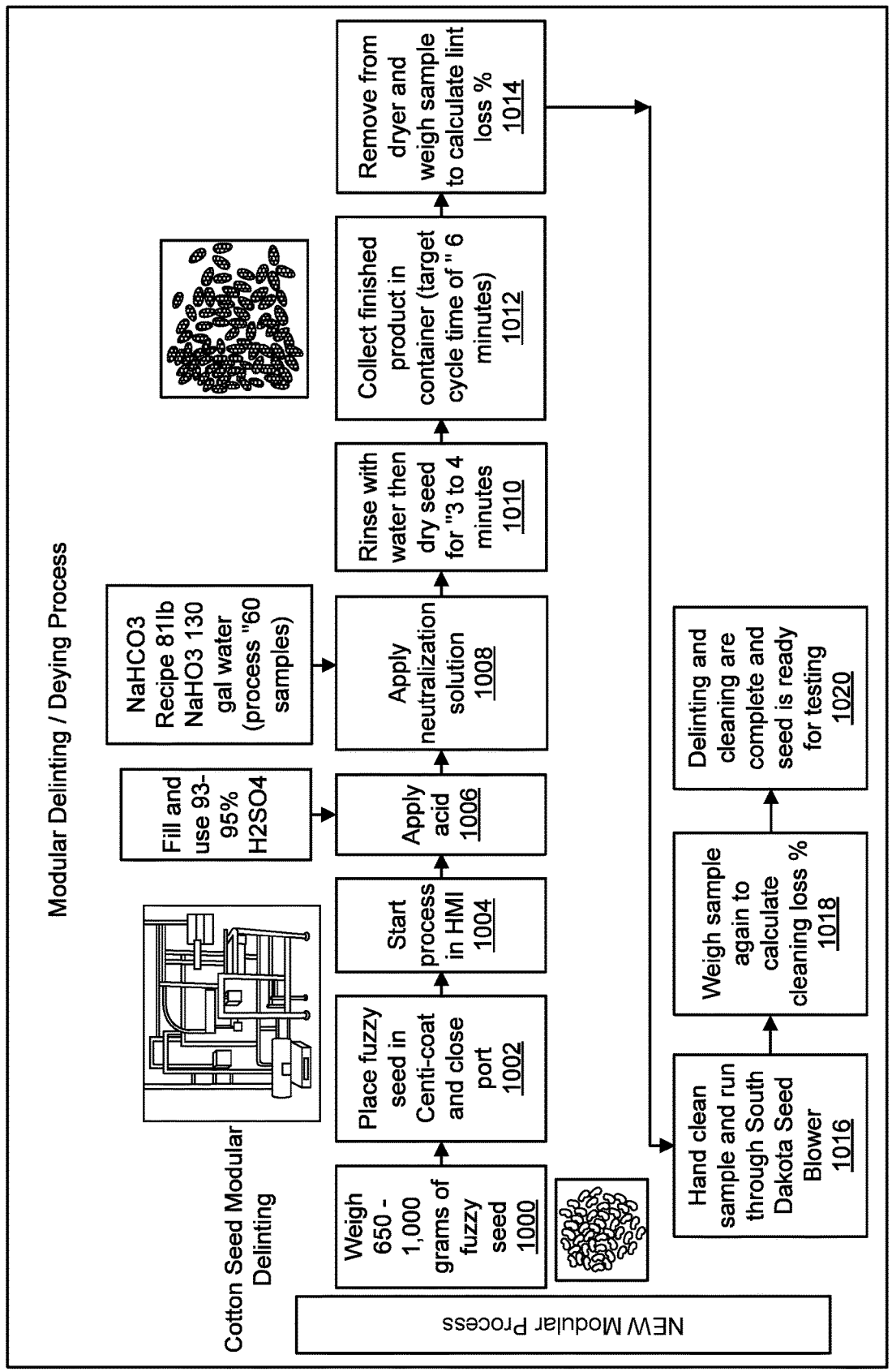
FIG. 6 is a flow diagram illustrating one method for delinting seeds using the seed delinting system of the present disclosure.

Referring to FIG. 6, one method of operating the seed delinting system 10 to delint cottonseeds (e.g., delinting process) is shown and described. In this embodiment, first, at step 1000, the technician weighs an appropriate amount of cottonseeds with lint (e.g., fuzzy seed). In the illustrated embodiment, the seed applicator 40 receives about 650 grams to about 1,000 grams (about 1.4 lbs. to about 2.2 lbs.) of seed. At step 1002, the technician then manually loads the seeds into the seed applicator 40 using the seed loading chute 58 and closes the lid 60 and secures the latch. In another embodiment, the seed loading chute 58 is fluidly connected to a hopper (not shown) that stores seeds and dispenses them into the seed applicator 40 via the seed loading chute 58 at the direction of the controller 28. Once the seeds are loaded into the seed applicator 40, the technician presses an input on the controller 28 at step 1004 to start the delinting process. Once the controller 28 is directed to start the delinting process, the controller operates the driver 48 until the rotor 46 is rotating at a set rate (revolutions per minute), such as 1750 revolutions per minute, which typically takes about 5 seconds. The controller 28 also opens the selectively actuatable valve 32 associated with the drain 52. Then, at step 1006, the controller 28 opens the selectively actuatable valve 32 associated with the concentrated acid solution supply line 24 and operates the associated pump 26 to dispense a set amount of concentrated acid solution through the nozzle 56, into the interior 44 of the seed applicator 40 and onto the seeds. After the set amount of concentrated acid solution is dispensed, the controller 28 turns off the pump 26 and closes the selectively actuatable valve 32. In one embodiment, approximately 240 mL of concentrated acid solution containing at least about 90%, for example from about 93% to about 95%, sulfuric acid is dispensed into the seed applicator 40. Alternatively, the concentrated acid solution could contain a higher percentage sulfuric acid (e.g., 98%) and be diluted down. The atomizer 54 ensures that the concentrated acid solution is evenly distributed, as well as the subsequent solutions.

After the concentrated acid solution is applied, the controller 28 will continue to rotate the rotor 46 for a set, adjustable amount of time before the next step. Seed-to-seed mixing of the concentrated acid solution is accomplished by the random contact between seeds and the relative seed motion caused by the rotation of the rotor 46. The concentrated acid solution reacts, nearly instantaneously, with the lint on the cottonseeds, hydrolyzing and removing the lint from the seeds. The seed-to-seed mixing further facilitates the removal of the lint through the random contact between the seeds. In addition, any unabsorbed concentrated acid solution will exit the interior 44 through the drain 52 and flow into the waste reservoir 50. In one embodiment, the controller continues to rotate the rotor 46 after the dispensing of the acid solution and prior to the dispensing of the base solution to allow time for the reaction between the lint and acid to occur before beginning the next step.

Next, at step 1008, the controller 28 opens the selectively actuatable valve 32 associated with the base solution supply line 24 and operates the associated pump 26 to dispense a set amount of base solution through the nozzle 56 and onto the seeds to neutralize the concentrated acid solution. After the set amount of base solution is dispensed, the controller 28 turns off the pump 26 and closes the selectively actuatable valve 32. In one embodiment, approximately 9,200 mL of base solution containing 5% to 15% base solution (for example, sodium bicarbonate) is dispensed into the seed applicator 40. It is desirable to neutralize concentrated acid solution quickly after the application concentrated acids solution to limit the amount of heat generated by the hydrolyzing reaction. If too much heat is generated, the seeds may incur damage (e.g., the seeds reach the sterilization temperature). Accordingly, the vertical integration of the seed applicator 40 allows the solutions to be applied to the seeds while allowing the solutions to immediately drain from the seeds (e.g., prevent the solutions from collecting and building up around the seeds).

After the base solution is applied, the controller 28 will continue to rotate the rotor 46 for an adjustable amount of time before the next step to effectuate seed-to-seed mixing of the base solution. This allows the base solution to neutralize the concentrated acid solution and flow into the waste reservoir 50 through the drain 52. In one embodiment, the controller continues to rotate the rotor 46 after the dispensing of the base solution and prior to the dispensing of the rinse liquid to allow time for the reaction between the acid solution and the base solution to occur before beginning the next step.

Next, at step 1010, the controller 28 opens the selectively actuatable valve 32 associated with the rinse liquid supply line 24 to dispense the rinse liquid for an adjustable amount of time through the nozzle 56 and onto the seeds to rinse any remaining neutralized solution from the seeds. The controller 28 monitors the flow meter 35 connected to the supply line 24 and closes the selectively actuatable valve 32 after the flow meter has indicated the set amount of rinse liquid has been dispensed.

After the rinse liquid is applied, the controller 28 will continue to rotate the rotor 46 after the dispensing of the rinse liquid and prior to the drying step to effectuate seed-to-seed mixing of the rinse liquid. This allows the rinse liquid to completely wash the neutralize solution from the seeds and flow into the waste reservoir 50 through the drain 52. In one embodiment, the controller continues to rotate the rotor 46 for a set amount of time before beginning the next step.

Next, the controller 28 will close the selectively actuatable valve 32 associated with the drain 52. The controller 28 then operates the blower 71 to supply forced air into the interior 44 for an adjustable amount of time to dry the cottonseed in the seed applicator 40. The controller 28 monitors the temperature of the heated forced air using the temperature sensor to ensure the temperature of the forced air does not become too high and damage the seeds. The controller 28 may also be able to control the temperature of the forced air supplied by the blower 71. In one embodiment, the controller 28 operates the blower 71 for from about 1 minutes to about 7 minutes, for example about 5 minutes, to dry the seeds. In one embodiment, the seed applicator 40 includes a moisture sensor (not shown) that senses the moisture content of the interior and the controller 28 operates the blower 71 based off the readings of the moisture sensor. In this embodiment, when the moisture sensor indicates when the moisture in the interior has reached a preset minimum requirement (e.g., the seeds are dry), the blower 71 may turn off.

At this point, after the seeds are dry, the delinting of the seeds is complete. The seed delinting system 10 can delint cottonseeds in approximately 6 to 8 minutes. At step 1012, the controller 28 sends an alert to the technician that the seeds are ready to be discharged from the seed applicator 40. The technician then places a receptacle (e.g., collection bin) on the platform 78 underneath the seed chute 66 and presses a door button (not shown), which may be an input on the controller 28 or a physical button (e.g., switch) on the actuator 68, to open the discharge door 62 (e.g., move the discharge door to the open position) to allow the seeds to enter the seed chute 66 and exit into the receptacle. To discharge the seeds from the seed applicator 40, the controller 28, preferably, operates both the driver 48 and the blower 71 such that the rotation of the rotor 46 and the movement of the force air moves the seeds through the discharge opening 64 and into the seed chute 66 via gravitational forces. In one embodiment, the controller 28 operates both the driver 48 and blower 71 when the door button is pressed. The technician can visually inspect the mixing bowl 12 to ensure all the seeds have been discharged and may continue to press the door button until the seeds have been discharged from the seed applicator. In one embodiment, the technician may repeatedly press the door button to disrupt the movement of the seeds in the seed applicator 40 to discharge the seeds. The actuator 68 returns the discharge door 62 to the closed position upon the release of the door button.

In addition, after the seeds are dry (e.g., the seeds have been delinted), the controller 28 may open the selectively actuatable valve 32 associated with the waste reservoir 50 and/or operate the pump 72 to move the waste solution to the secondary waste system 73 and empty the waste reservoir. The controller 28 may also operate the pump 72 to empty the waste reservoir 50 based on signals received from one or more fluid sensors (e.g., continuous level sensor, high level limit sensor, low level limit sensor) associated with the waste reservoir and/or scale 74. For example, in one embodiment, the controller 28 continuously monitors the weight of the waste reservoir 50, via the scale 74 (e.g., the controller is in communication with the scale), and operates (e.g., turns on) the pump 72 once a predetermined weight (e.g., high value) is reached to empty the waste reservoir. The controller 28 may operate the pump 28 until the weight of the waste reservoir reaches a predetermined low value or the low level limit sensor indicates the waste solution has reached an acceptable low level (e.g., empty position). In addition, the controller 28 may continuously monitor the waste solution level in the waste reservoir 50 using one or more of the fluid sensors and operate (e.g., turn on) the pump 72 when the waste solution level in the reservoir reaches a predetermined high level (e.g., fill position). Using the fluid sensor to empty the waste reservoir 50 may be in addition to using the scale 74, as a backup/redundant system, or in place of the scale. While the pump 72 is emptying the waste reservoir 50, the controller 28 will prevent the seed applicator 40 from operating. Once the waste reservoir 50 is generally empty, the controller 28 closes the selectively operable valve. The waste reservoir 50 collects all solutions used to delint the seeds before moving the waste solution to the secondary waste system 73 so that the waste solution is at a generally neutral pH. The secondary waste system 73 and any intervening components may not be able to handle a waste solution that does not have a generally neutral pH. Further, waiting to operate the pump 72 to empty the waste reservoir 50 prevents the pump from running dry.

After the seeds are discharged from the seed applicator 40, the controller 28 operates the driver 48 to slowly stop the rotation of the rotor 46 (e.g., turn off the driver). The controller 28 may also send a prompt with or without an alert to the technician to input a signal into the controller 28 to acknowledge the delinting process once the seed delinting system 10 is complete. Once the technician acknowledges the delinting process is complete, controller 28 can indicate the next delinting process is ready to start. The controller 28 may also, before indicating the delinting process is ready to start, check the fluid levels of the acid, base, and waste reservoirs 20, 22, 50 using one or more of the different fluid sensors to ensure these level are appropriate to run the next cycle. In one embodiment, the controller 28 identifies and saves the time of each stage of the delinting process and is configured (e.g., programmed) to share this timing information with a plant network system for optimization and troubleshooting purposes.

Subsequently, after the delinting process, at step 1014, the technician can weigh the delinted seeds to determine the lint loss percentage. The technician may then, at step 1016, place the seed into a seed blower 71 to further clean the seeds and remove any remaining lint. At step 1018, the technician may then weigh the seeds again to determine the cleaning loss percentage. At step 1020, the process is complete and the seeds are ready to be used in a subsequent process, such as undergoing testing, quality analysis or being used in a process of manufacture.

In another method of delinting cottonseeds, before, after and/or instead of the automated delinting process above, the technician may manually delint the cottonseeds using the sink 80. The technician places a set amount of cottonseed in the sink 80 to be delinted. The technician then opens the selectively actuatable valve 32 associated with the concentrated acid outlet and actuates the switch to operate the pump 26 associated with the concentrated acid solution to dispense a continuous supply of concentrated acid solution at a set rate into the sink 80. In one embodiment, the concentrated acid solution contains about 93% to 95% highly concentrated (for example, at least about 90% or from about 93% to about 95%, adjustable based on concentration) sulfuric acid and is dispensed at a rate of approximately 0.95 gal/min (3.6 L/min). However, the concentrated acid may contain other percentages of sulfuric acid without departing from the scope of the disclosure. The skilled person will understand that these values can be manipulated based on a number of factors that will be readily evident. The switch can be in direct communication with the pump 26 such that the switch controls the pump (e.g., turns the pump on or off) or the switch can be in communication with the controller 28 which controls the pump based on the signal from the switch. During the application of the concentrated acid solution, the technician may manually agitate, using protective gloves and/or a tool, the seeds to effectuate seed-to-seed mixing of the solution and delinting. Any excess concentrated acid solution will exit the sink 80 through the sink drain 82 and flow into the waste reservoir 50. Once the desired amount of concentrated acid solution is dispensed, the technician actuates the momentary switch to turn the pump 26 off and closes the selectively actuatable valve 32.

The technician then opens the selectively actuatable valve 32 associated with the base solution outlet and actuates the switch to operate the pump 26 associated with the base solution to dispense a continuous supply of base solution at a set rate into the sink 80. In one embodiment, the base solution contains about 5% to 15% sodium bicarbonate and is dispensed at a rate of approximately 3.8 gal/min (14.4 L/min). As discussed above, the switch can be in direct communication with the pump 26 or in communication with the controller 28. Any excess base solution will exit the sink 80 through the sink drain 82 and flow into the waste reservoir 50. Once the desired amount of base solution is dispensed to neutralize the concentrated acid solution, the technician actuates the switch to turn the pump 26 off and closes the selectively actuatable valve.

The technician then opens the selectively actuatable valve 32 associated with the rinse liquid outlet to dispense a continuous supply of rinse liquid at a set rate into the sink 80. In one embodiment, the base solution is water (e.g., tap water) and is dispensed at a rate commensurate with the pressure supplied by the water main. The technician can use their own discretion regarding the amount of rinse liquid used to wash the seeds. Any excess rinse liquid will exit the sink 80 through the sink drain 82 and flow into the waste reservoir 50. Once technician determines the seeds have been completely washed, the technician closes the selectively actuatable valve 32. The technician then places the now delinted seeds into a dryer (not shown) to remove any residual moisture from the seeds. In this embodiment, if the sink drain 82 includes a selectively actuatable valve 32, the technician or the controller 28 opens the valve before the application of the concentrated acid solution and keeps the valve open through the application of the rinse liquid. After the technician has finished using the sink 80 to delint the cottonseeds, the water reservoir 52 may be emptied, as described above.

In addition, should the technician observe any lint remaining on the seeds after the delinting process, such as the automatic delinting using the seed applicator 40 or the manual delinting using the sink 80, the technician can subject the cottonseeds to a second delinting process which can be the same process as the first, a variation thereof or a different process.

As mentioned above, the seed applicator system 10 is disposed in a fume hood 30. In one embodiment, the controller 28 is connected to (e.g., in communication with) the fume hood 30 such that the controller will not run the delinting process (e.g., automatic delinting using the seed applicator 40) unless the fume hood is on (e.g., collecting and venting air). Further still, in the manual delinting process (e.g., delinting using the sink 80), the controller 28 can be configured (e.g., programmed) to not allow the pumps 26 to turn on and supply the concentrated acid and base solutions to the sink even when the corresponding switches are actuated, unless the fume hood 30 is on.

The seed delinting system 10 is able to test small batches of cottonseeds—for example, from about 650 grams to about 1,000 grams (about 1.4 lbs. to 2.2 lbs.). This allows a technician to efficiently test the effectiveness of new concentrate acid and base solutions either separately or in combination. The seed delinting system 10 may be run as a fully automated system that delints, neutralizes, rinses and dries the cottonseeds with a process time of 6 to 8 minutes, significantly reducing the amount of time it takes to delint cottonseeds over previous manual methods. In addition, by fully automating the delinting process, numerous safe guards are put in place and safety risks are reduced. For example, the controller 28 is in communication with the various components of the seed delinting system 10 to make sure conditions and settings, such as but not limited to the different solutions levels, are within appropriate parameters. Likewise, the automated seed delinting system 10 does not require the technician to come into contact with the hazardous concentrated acid and base solutions during the delinting process. Accordingly, by delinting, neutralizing, rinsing and drying the cottonseed in the same device (e.g., seed applicator 40), the delinting process time and the exposure to the technician is reduced. Thus, the seed delinting system 10 provides safety interlocks, integrated containment, capability to prepare and store bulk base solutions instead of preparing the base solution as needed, human machine interface technology, removing the waste solution to the secondary waste system 73 and the ability to perform an automated delinting process in a fume hood 30. Moreover, the seed delinting system 10 may be used for other processes besides delinting. For example, the seed delinting system 10 may be used to sanitize and clean seed, without delinting. Accordingly, it is understood the seed delinting system 10 can apply other solutions (broadly, treatments) to the cottonseeds than described herein.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A seed processing system for cottonseeds comprising:
a fluid distribution system configured to sequentially dispense in order an acid solution, a base solution for neutralizing the acid solution, and a rinse liquid onto the cottonseeds; and
a seed applicator system defining an interior configured to hold the cottonseeds and sequentially receive the acid solution, the base solution and the rinse liquid dispensed from the fluid distribution system onto the cottonseeds within the interior, the seed applicator system including:
a rotor configured to agitate the cottonseeds in the interior as the acid solution, the base solution and the rinse liquid are dispensed onto the cottonseeds to effectuate mixing;
a seed loading chute configured to receive the cottonseeds into the interior; and
a discharge for removing the cottonseeds from the interior, the discharge separate from the seed loading chute.

2. The seed processing system of claim 1, wherein the seed applicator system includes a drain that permits the acid solution, the base solution and the rinse liquid to exit the interior.

3. The seed processing system of claim 2, further comprising a waste solution reservoir fluidly connected to the drain of the seed applicator system for receiving the acid solution, the base solution and the rinse liquid that exit the interior of the seed applicator system through the drain.

4. The seed processing system of claim 1, wherein the seed applicator system includes a blower fluidly connected to the interior and configured to direct heated air into the interior to dry the cottonseeds.

5. The seed processing system of claim 4, further comprising a controller configured to monitor a temperature of the heated air from the blower.

6. The seed processing system of claim 1, further comprising a controller in operative communication with the fluid distribution system and the seed applicator system, the controller being configured to automate the seed processing system by controlling operation of the fluid distribution system and the seed applicator system.

7. The seed processing system of claim 1, wherein the fluid distribution system comprises an acid reservoir to contain the acid solution, and a base reservoir to contain the base solution.

8. The seed processing system of claim 7, wherein the fluid distribution system further comprises supply lines to fluidly connect the acid reservoir, the base reservoir, and a rinse liquid source, respectively, to the seed applicator system.

9. The seed processing system of claim 8, wherein the supply lines contain valves to selectively open and close the supply lines.

10. The seed processing system of claim 7, wherein at least one of the acid reservoir and the base reservoir includes a fluid level sensor for determining an amount of solution in the reservoir.

11. The seed processing system of claim 1, further comprising a sink fluidly connected to the fluid distribution system and configured to receive the acid solution, the base solution and the rinse liquid dispensed from the fluid distribution system.

12. The seed processing system of claim 1, wherein the seed applicator system further includes a first nozzle and a second nozzle in fluid communication with the interior, the first nozzle configured to dispense the acid solution into the interior and the second nozzle configured to dispense the base solution into the interior.

13. The seed processing system of claim 12, further comprising a third nozzle in fluid communication with the interior, the third nozzle configured to dispense the rinse liquid into the interior.

14. The seed processing system of claim 1, comprising:
a controller in operative communication with the fluid distribution system and the seed applicator system, the controller configured to:
control operation of the fluid distribution system to sequentially deliver the acid solution from the acid reservoir, the base solution from the base reservoir, and the rinse liquid to the cottonseeds in the interior of the seed applicator; and
control operation of the seed applicator system to actuate the rotor to agitate the cottonseeds in the interior as the acid solution, the base solution, and the rinse solution are dispensed onto the cottonseeds in the interior.

15. The seed processing system of claim 12, wherein the seed processing system further includes:
a drain in fluid communication with the interior, the drain operable to remove the acid solution, the base solution, and the rinse liquid from the interior; and
a waste reservoir configured to receive the acid solution, the base solution, and the rinse liquid removed from the interior by the drain.

* * * * *